United States Patent [19]

Levin et al.

[11] Patent Number: 4,821,178

[45] Date of Patent: Apr. 11, 1989

[54] INTERNAL PERFORMANCE MONITORING BY EVENT SAMPLING

[75] Inventors: Arthur L. Levin, Pleasant Valley; Don W. Rain; David J. Thomas, both of Poughkeepsie, all of N.Y.

[73] Assignee: International Business Machines Corporation, Armonk, N.Y.

[21] Appl. No.: 896,994

[22] Filed: Aug. 15, 1986

[51] Int. Cl.[4] .............................................. G06F 9/00
[52] U.S. Cl. ...................................................... 364/200
[58] Field of Search ................................ 364/200, 900

[56] References Cited

U.S. PATENT DOCUMENTS 4,068,304  1/1978  Beausoleil et al. ................. 364/200
4,435,759  3/1984  Baum et al. ......................... 364/200
4,590,550  5/1986  Eilert et al. ......................... 364/200

Primary Examiner—Gareth D. Shaw
Assistant Examiner—John G. Mills
Attorney, Agent, or Firm—Bernard M. Goldman

[57] ABSTRACT

The disclosure provides event-controlled operations for an internal hardware/software monitor for a processor in a data processing system. It embeds and distributes in each processor at least one instrumentation table unit (ITU) and event detection circuitry to detect events and conditions for collecting event-sampled hardware signals provided in the processor hardware in which the respective ITU is embedded. Instrumentation measurement is controlled centrally in the system. Sampling of the CPU signals for recording in the ITU is done at (or a sub-multiple of) the occurrence rate of the selected event(s) in the processor. The sampled signals are recorded in the ITU. The ITUs of plural processors are asynchronously operated in a system. The event-driven monitoring circuitry may be solely provided in an ITU, or it may be superimposed on a timer-driven internal instrumentation system of the type described in U.S. Pat. No. 4,590,550 in which the ITU is shared between event and timer driven modes of operation. Branch-taken event monitoring is also included in the disclosure.

14 Claims, 2 Drawing Sheets

INTERNAL PERFORMANCE MONITORING BY EVENT SAMPLING

INTRODUCTION

The subject invention provides an event-driven method and means for sampling hardware generated signals within a data processing system based upon the occurrence of selected processing events and conditions. The event signals are sampled and recorded by means which are distributively interwoven within the CPU structure.

BACKGROUND

Many computer performance monitoring tools have been developed for evaluating the performance of computer systems. They have been conceived with various goals. Some are software, some hardware. Most hardware monitors have been separate from the system they measure, connected to it by manually inserted probes or by a plug interface.

The traditional distinction among monitor types is between counters and recorders. The counter type counts the number of occurrences of each of a set of events, with the counted output normally representing some kind of meaningful information. The recorder type collects data about defined events on recording media. Later analysis of both types is usually needed to make the collected data intelligible. IBM monitors in the early 1960's measured specified states in an IBM 7090 data processing system, such as: total CPU operation time; channel A operation time; channel B operation time; CPU busy with no I/O in process; tape equipment operation time, CPU in wait state; and card equipment operation time.

Software monitors are widely used today but are limited to sampling data stored in memory. They cannot detect hardware states per se. Also, software monitors universally have the drawback of distorting the performance of the system they are measuring, because software monitors compete with the program being measured for use of the resources in the system.

Monitoring functions may also be separated into two other subtypes: those that sense hook instructions put into a program to assist a monitoring operation, and those that sense some characteristic stored by an unmodified running program. For example, a hook may be put into a program routine so that the number of times the hook instruction executed would indicate the number of times the routine was entered, or the number of times routine looped, depending on where the hook was inserted. Both software and hardware monitors have been used to sense and count the occurrences of a hook instruction. Also, monitor functions that have been used to sense non-hook program characteristics, for example, have counted the occurrence of specified operation codes, or plotted the address distribution of accesses to main storage. Non-operable instructions have been inserted as hooks to cause a program interrupt that initiated the recording of an identifying characteristic of the hook instruction. Further, the Monitor Call (MC) instruction in the IBM System/370 architecture was provided for use as a hook instruction insertable into program code.

Monitors and their use have been described in publications, such as a book entitled "Evaluation and Measurement Techniques for Digital Computer Systems", by M. E. Drummond, Jr., published in 1973 by Prentice-Hall Inc., Englewood Cliffs, N.J.

Hardware monitors have been commercially sold, such as the Comten 8028 monitor and the Tesdata monitors. Software monitors have been in public use for many years such as the IBM "Resource Measurement Facility" (RMF) and the Candle "Omegamon" program.

Examples of early patents on data processing system hardware monitors externally connectable to a system are represented by U.S. Pat. No. 3,399,298 to H. M. Taylor entitled "Data Processing Profitability Monitoring Apparatus"; U.S. Pat. No. 3,588,837 to R. D. Rash et al entitled "System Activity Monitor"; and U.S. Pat. No. 4,068,304 to W. F. Beausoleil et al entitled "Storage Hierarchy Performance Monitor" (assigned to the same assignee as this application).

Another externally connected monitor is disclosed and claimed in U.S. Pat. No. 4,435,759 to R. I. Baum et al (assigned to the same assignee as this application). It provides a hardware monitor with a software correlation characteristic. It is externally connected to a uniprocessor or multiprocessor system to collect selected hardware events in that system. It relates the collected hardware events to causative software by simultaneously capturing and recording the address of a potentially causative software instruction at the time the hardware event is being sampled for collection. Collecting is done on every Nth occurrence of a predetermined hardware event, to capture the causative instruction address and one or more other hardware states that can be correlated with the captured instruction address. Hence, the captured instruction addresses relate the simultaneous collected events to the software that potentially caused them. U.S. Pat. No. 4,435,759 also discloses a set of monitors, externally connected to the CPU's in a multiprocessor, with interconnections between the monitors, all monitors also being connected to an external control processor. The control processor issues read commands to the plural external monitors to synchronize their capture and outputting of events in the different CPU's being monitored. The control processor in this way groups the captured events, by receiving and recording each group as the set of events resulting from each read command.

U.S. Pat. No. 4,590,550 (assigned to the same assignee as this application) to J. H. Eilert et al entitled "Internally Distributed Monitoring System" discloses a timer-driven performance monitor, built into and distributed within the system it measures, thereby eliminating some monitoring problems caused by the external location of prior monitors.

SUMMARY OF THE INVENTION

The present invention differs from U.S. Pat. No. 4,590,550 in providing an event-driven monitor which, as discussed below, is internal to a processor (which may be in a UP or MP) to allow a concentrated mode of data capture especially suitable for measuring the performance of very fast LSI hardware in relation to its driving software, including during the developmental debug phases of the hardware or software. Nevertheless, the subject invention is built on the base environment defined in U.S. Pat. No. 4,590,550. The objectives of this invention are to:

1. Provide self-contained monitoring for a system in which LSI technology may prevent the attachment of an external hardware monitor.

2. Embed instrumentation table units (ITU's) within each CPU in the system, to monitor an identifiable set of signals in the CPU.

3. Enlarge the set of data representing signals subject to collection, beyond previous monitors.

4. Handle cross-processor monitoring correctly with LSI technology, even though monitoring operates asynchronously between plural CPUs in an MP.

5. Maintain hardware-software correlation by capturing the instruction address concurrent with other state data in each CPU.

6. Capture virtual address-space identifier signals available as a condition in the hardware during program execution in a private virtual storage area while using virtual addressing.

7. Maintain time-stamping for a collection of data, using the time of day (TOD) of the most recently executed Trace instruction in relation to data collections obtained by event sampling. The time-stamped trace instructions give a higher level of software resolution than the captured instruction addresses, by enabling a comment field in the trace table entries to resolve a program identification that might otherwise be ambiguous.

In U.S. Pat. No. 4,590,550, data collection is initially made in instrumentation table units (ITU's) which are hardware arrays built into the system in areas local to signals of interest. The ITU's in a processor are also useable for collection of event-sampled signals of this invention, as well as the prior timer-sampled signals in U.S. Pat. No. in 4,590,550, which described ITU's as either dedicated to instrumentation, or shared by instrumentation and diagnostic operations. (Shared arrays have only one type of operation at any given time.)

This invention applies to ITU's located in any hardware functional element in a system, and component parts of the ITU may be distributed within the element in proximity to the sources of event signals that may be monitored. There may be more than one ITU in an element as an optional design choice, such as separate ITU's in a CPU's instruction unit, execution unit, and cache control unit (BCE), for sampling locally derived event signals. While the invention may be used in all types of system elements, hereinafter the CPU element is used as an example.

Event measurement sampling by this invention is not done in the manner that sampling was described in U.S. Pat. No. 4,590,550, which was done at regular time intervals based on the user's selection of one from a number of possible timer-sampling rates, e.g. every millisecond. But this invention may be used alternatively with the invention in U.S. Pat. No. 4,590,550 by superimposing the structure for this invention on the structure found in U.S. Pat. No. 4,590,550.

Also, the event-sampling used by this invention does not use the synchronizing property of the periodic sampling pulses described in U.S. Pat. No. 4,590,550, which were distributed to all ITU's in the system to synchronize the collection of signals. There, each ITU contained an Instrumentation Trace Array (ITA) with multiple entries for the recording of data signals. An initial reset was done on all ITU's to set them to the same address, namely zero; and thereafter their addresses were incremented synchronously by the common sampling pulse. Equal entry positions (addresses) were therefore simultaneously accessed in a corresponding entry in every ITU array, and the entry in every ITU was incremented in unison by the next periodic sampling pulse. The contents of corresponding ITU entries were the data presented at the time the same sampling pulse switched the "current ITA address" to its next entry. Thus, the corresponding entries in all ITU's, i.e. those with the same address, had their data captured at the same time throughout the system to maintain synchronization.

Also, in U.S. Pat. No. 4,590,550, ITU addressing could automatically wrap back to address zero after the last location was filled. Also, an output signal could be generated whenever the ITU address either passed its half-filled address or wrapped back. On the occurrence of either signal, the most recently filled half of all ITU's was moved to output buffers for writing an I/O device. Output thus could alternate between the two halves of each ITU, under microcode control.

The event-driven sampling in this invention has the advantage over the timer-driven sampling in U.S. Pat. No. 4,590,550 that if signals of interest occur infrequently relative to the timer pulse, or occur at times other than the timer pulses, then the recorded time-driven samples will not contain data useful for analysis of such events. For such events, the measurement run must go on for an excessively long time in order for a sufficient number of "good" samples to be collected. This can become an insuperable problem if:

1. The signal being studied is infrequent, such as cross-interrogate hit. In this situation, almost all timer-driven samples may be useless, since their "XI hit" state indicator may be off due to lack of any XI hit occurring during a timer-driven sample pulse.

2. The system being measured (hardware and/or software) is at an operating level that may not remain stable, or even functional, for a long enough period to be time sampled.

Event-driven sampling is provided in this specification as an alternative instrumentation mode for operation within the general ITU structure disclosed in U.S. Pat. No. 4,590,550. Event-driven sampling provides a sampling pulse only when a selected event occurs, which may occur at irregular times, instead of at the regular (periodic) occurrences of the timer-driven sampling pulses that may not occur during the occurrence of the event of interest. Thus, event-driven sampling records no useless samples, and the measurement intervals may be variable. Even if the event sampling rate is much slower than timer-driven sampling, the yield in useful samples will in general be significantly higher for infrequent asynchronous event occurrence.

Event sampling in each CPU may be triggered by one type of event, or by plural types of events, either alone or in combination with one or more CPU conditions, in any logical combination of signals which may be ANDed, ORed, and/or BUTNOTed together to provide an event-recording signal.

Event sampling is described for CPU elements herein, in which the desired result is a correlation between program execution and behavior elsewhere in the CPU. Essential internal CPU signals for this correlation are derived within the instruction element (IE), execution element (EE), and buffer control element (BCE).

Event sampling measurements need only be local within each CPU in a multiprocessor. That is, event sampling (unlike timer sampling) does not require measurement recording synchronization for different CPUs. All active CPU's in an MP may asynchronously record events affecting plural CPUs and nevertheless obtain any inter-CPU relationship. That is, an event local to a single CPU, but affecting another CPU, nevertheless can be handled as a local event. For example, if a "cross-interrogate hit" is selected as an event for sampling measurement, its recorded sampling on CPU 1 could include the CPU identifier of the requesting CPU 2 and the time-of day. Then, related events can be determined from the data recorded from the ITUs of the two CPUs without any synchronization between the event samplings recorded for the different CPUs. Hence, the ITUs of the different CPUs can fill asynchronously at different rates determined by the event frequencies in the respective CPUs.

CPU signals or states used in event sampling may be classified into the categories of (1) event signals, and (2) condition signals, which differ in their duration. Event signals have only a short duration, e.g. a single machine cycle. Condition signals have a longer duration lasting many cycles and may exist when events happen.

Event sampling may be made conditional on the current instruction address falling within a given range, (e.g. the PER registers in the S/370 implementation); or on a special latch having been set by special state instructions (e.g. diagnose or an emulation instruction) placed in the code to signal entry to and exit from programmed routines of interest. Condition control allows another dimension of selectivity, in that event sampling can be turned on and off under control of one or more conditions.

A special type of event sampling included in the subject invention is the sampling of "successful branch" events, which differ from most other events that are primarily studied to determine the hardware characteristics of code execution (such as cache behavior). The recording of "branch-taken" data documents the primary paths of program control flow, and their sequence of events (rather than their aggregate frequency) is the objective. Branch sampling places some special constraints on implementation, so that branch sampling may be handled as a separate instrumentation mode. Conceptually, however, sampling on a branch event is clearly an instance of event sampling.

The recording of event sampling is controllably adjusted to every Nth event occurrence in which N is any integer, including one. For frequent events, N is greater than one for frequency reduction control which is necessary to avoid filling the ITU array faster than its recorded content can be moved out to an output buffer, to prevent buffer overrun.

The invention avoids a problem occurring when CPU state data is sampled at fixed intervals (e.g. timer sampling to study the interaction between programs and computer structure, or other performance relationships). The problem with timer-sampling is that some events do not happen at the time of a time-sampling pulse. The required data occurrences may be so rare that a large number of time samples must be taken over a very long period of time to get a statistically meaningful number of samples that include the event of interest. Or, the event may occur so frequently that the required data rates are higher than feasible to record the number of samples taken.

Event-driven sampling solves these data rate problems by only recording selected states of the machine for certain events, where event is the occurrence of a specified hardware signal, and may indicate the fact that a branch instruction has been executed effecting a change in the instruction stream. In other words, with event-driven sampling, data recording is not done at arbitrary timer intervals, but only whenever the event (specified state or true branch) has occurred. Multiple sub-elements of a system may participate in an event sampling run, but an event causes a sample to be taken within only the prescribed CPU.

Selected conditions within the processor may be used to determine the sampling of selected event(s), such as the condition of the current instruction being within the range of the S/370 PER (program-event recording) registers, or the condition that a unique state has been set in the CPU through a state-controlling instruction (e.g. SIE or diagnose in S/370XA).

As previously stated, event-sampling rates may be controlled by limiting the recording of event information to every Nth event. This is useful in cutting down the amount of data to be collected for cases where information integrity is not seriously disturbed by such data loss, such as the "instruction first cycle" (IFC), for example N might be 5 to 7 if the other sampled data of interest is happening frequently enough; and for branch events, N might be 2.

The recording of samples based on time-sampling may gather each sample into a table, wrapping to the top of the table each time the table is filled. If the table is large enough, a mechanism can be used to record each table (or a part thereof) before unrecorded samples are overlayed.

An alternative collection approach is offered in this invention, made practical by the fact that only samples of interest are being gathered by event-sampling. This alternate approach stops recording in the table once the table (ITA) is filled, outputs the table entries, and restarts table recording from its beginning to fill the table again. This mechanism guarantees that all of L number of events will be saved, where L is the length of the table, no matter what the rate is for the event recording.

These and other objects, features and advantages of the invention may be more fully understood and appreciated by considering the following detailed description in association with the accompanying drawings.

DETAILED DESCRIPTION OF THE PREFERRED EMBODIMENT

Figure 1:
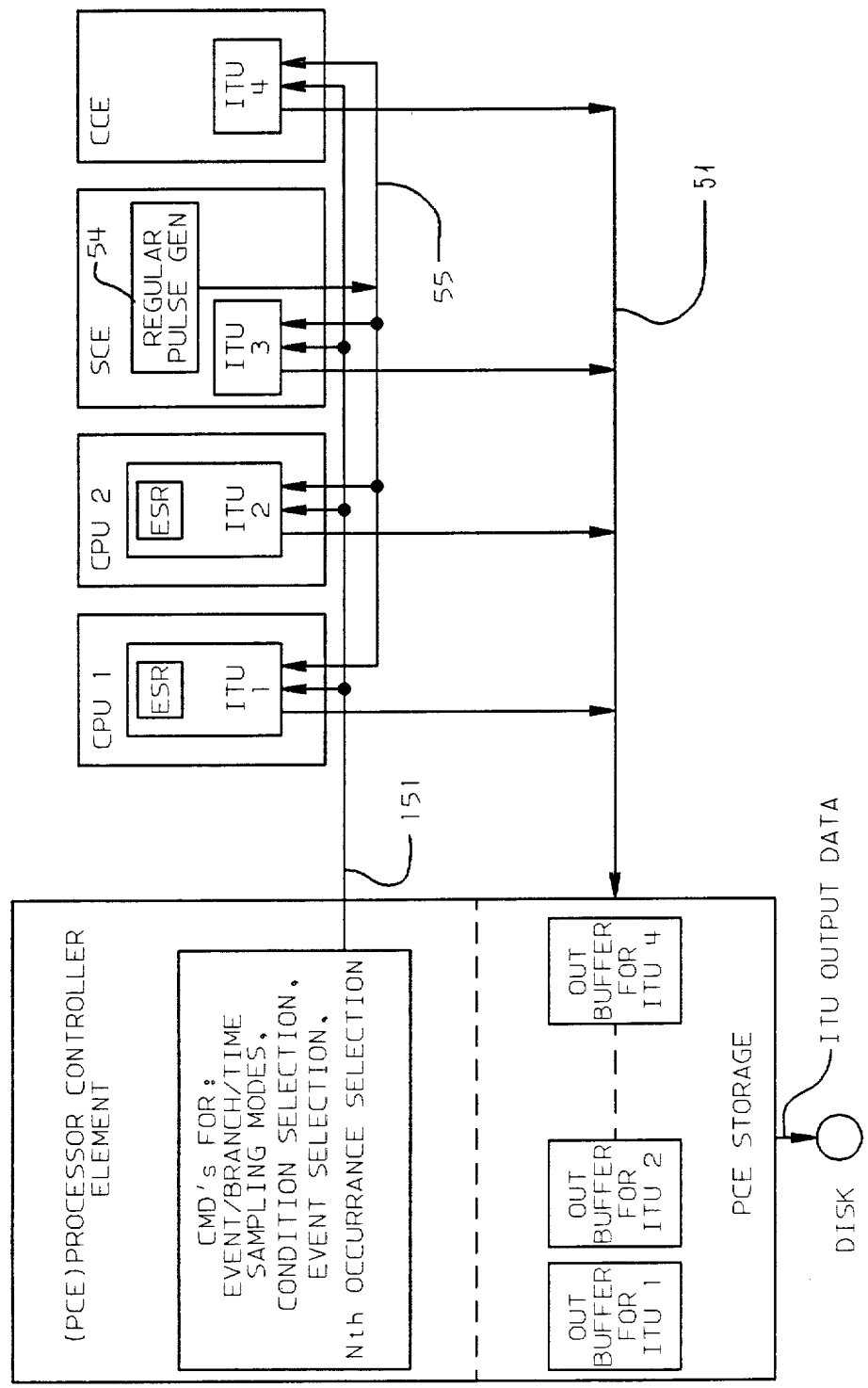
FIG. 1 is an overall block diagram of a data processing system containing the invention.

FIG. 1 shows a multiprocessor (MP). It provides an ITU (instrumentation table unit) internally in each of its CPU's, and other elements (SCE, CCE, and PCE). A command path 151 is shown linking the ITU's to the processor controller element (PCE), which is associated with the system operator console from which control over the ITU subsystem is provided, and all ITU output buffers reside in the PCE. The output buffers are filled from the ITUs by data transfers on path 51. When filled, each output buffer is written to a disk output medium under control of a PCE ITU output program, which also controls the transfers on path 51 of ITU data into the buffers from the respective ITU arrays.

Another PCE function in support of instrumentation is to initialize and terminate measurement runs, based on user inputs. The command structure and logic for starting and stopping a measurement run is like that found in the prior art and is not part of this invention.

FIG. 1 includes the overall instrumentation structure by showing the preferred embodiment as an ESR (event sampling recorder) within each CPUs ITU, which also includes the timer-driven embodiment described in the U.S. Pat. No. 4,590,550 specification which is incorporated by reference into this specification. Thus, each ESR shown in CPU1 and CPU2 obtains event-sampling for the respective CPU, as well as obtaining the regular time sampling previously disclosed and claimed in U.S. Pat. No. 4,590,550 using the timer-sampling pulses provided by a regular pulse generator 54 on distribution line 55 to the ITUs. The ITU's in the non-CPU elements, SCE and CCE, are not shown as using the invention, and they only use regular (periodic) time sampling. Hence, the structure in FIG. 1 of the subject application includes the structure disclosed in FIGS. 1 through 8 in U.S. Pat. No. 4,590,550, on to which each CPU in the subject application has added the structure shown in FIG. 2 of this application.

Figure 2:
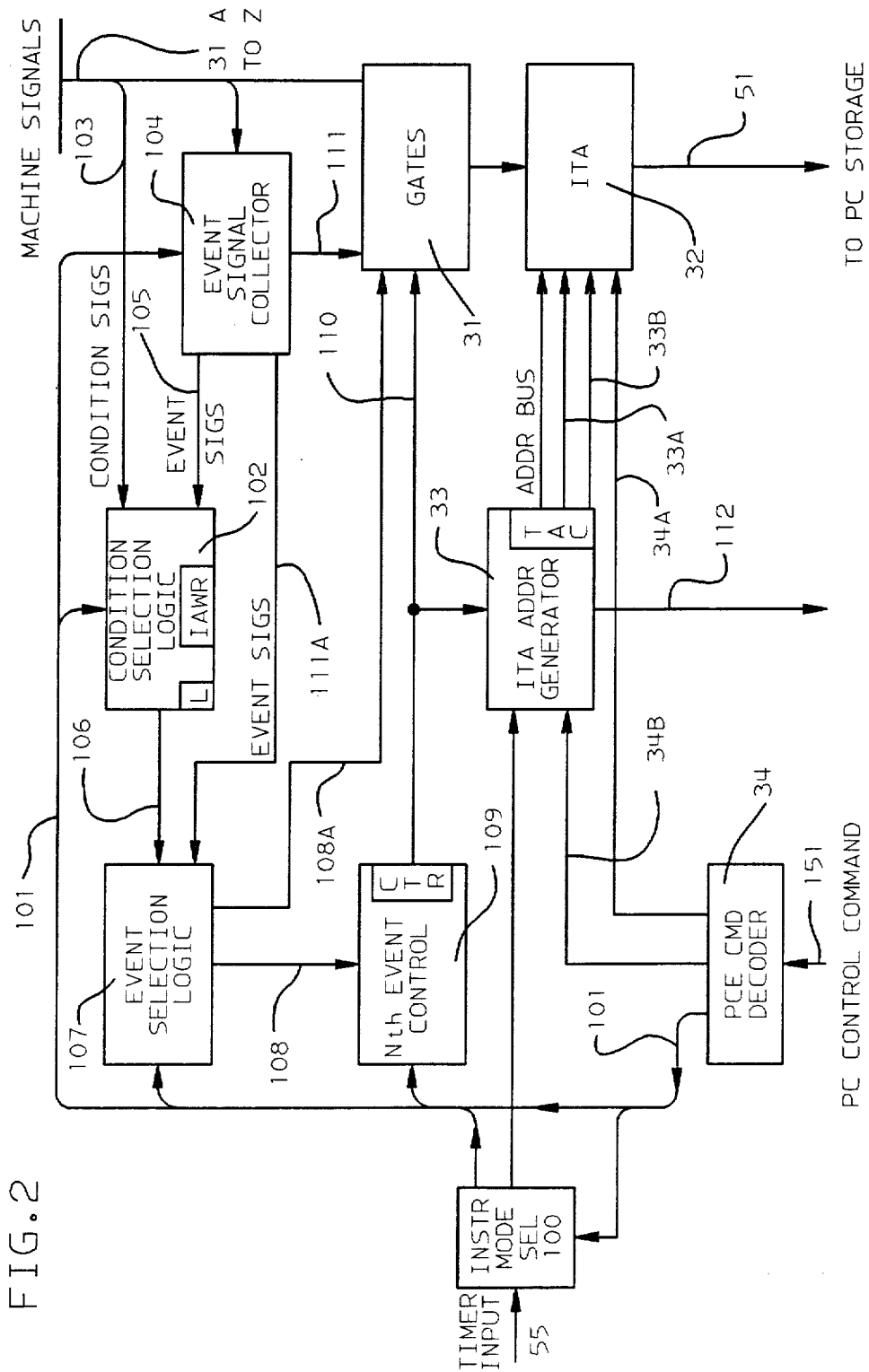
FIG. 2 is a block diagram of an embodiment of the invention in any CPU in FIG. 1.

In FIG. 2 of this application, reference numbers less than 100 refer to an item described in, and having the same reference number, in U.S. Pat. No. 4,590,550; and reference numbers over 100 are for new items in this application. Command path 151 is inclusive of command path 51 in U.S. Pat. No. 4,590,550.

The boxes shown in FIG. 2 represent logic functions performed by circuits and microcode. These boxes preferably are not physical packaging entities.

Measurement control is provided from a PCE console, where a user issues instrumentation commands and enters desired measurement characteristics, e.g. in an appropriate menu on a console display screen. The use of menus to select commands is well known in the computer arts. In FIG. 1, the command parameters are transmitted on path 151 to any selected ITU by a command, and that ITU receives and decodes the command in the PCE command decoder 34 and outputs command signals to boxes 102, 104, 107 and 108 in which they set appropriate latches in accordance with the decoded command signals. The command operations relating to event sampling include the following:

1. Selection of the sampling mode by setting the mode in instrumentation mode selection box 100. Any of event sampling mode, time sampling mode, or branch sampling mode may be selected in box 100. CPU signals or states used in event sampling may be classified into the categories of (1) event signals, and (2) condition signals, which differ in their duration. Event signals have only a short duration, e.g. a single machine cycle. Condition signals have a longer duration lasting many cycles, and may exist when events happen.

2. Selection of N for controlling the recording of every "Nth occurrence" of sampling is set in the Nth event control box 109. The selection of N is based on estimated CPU event frequency, so as to give a data collection rate that will fill the respective ITA and out buffer with no (or minimum) overrun. If N is too high, the sampling rate may be too slow and fall below its optimum buffer operation; but if N is too low, the sampling rate may be extremely frequent, and the ITA and/or its out buffer may fill before it can be completely readout, resulting in data loss from overruns and a suboptimal effective output rate.

3. Selection of most of the machine signals from lines 31 A to Z, is set into the event signal collector box 104. The event signals are chosen from the screen menu list provided by a command and they are entered into selection triggers (not shown) in box 104. The individual events each have a latch in box 104, in which the signal is momentarily collected as it happens and it may be stored for a few machine cycles. For example, the instruction counter settings will be provided to box 104, as will each operand address, etc. (Some of lines 31 A to Z are connected only to gates 31, such as for example, the lines providing signals for: operation codes, address space identifiers, the time-of-day, and storage protect keys, which however, can be combinatorialy selected by event selection box 107 in its output path 108A to gates 111.)

4. Selection of conditions to be monitored is set into condition selection logic box 102. Conditions last for a substantial duration while events last for a relatively short duration. Examples of selectable conditions are as follows:

Special instruction states lasting over multiple instructions (e.g. Start Interpretive Execution (SIE) instruction states);
Model dependent instruction controlling an instrumentation control and conditioning latch (ICCLATCH), e.g. Diagnose instruction.
Instruction address within range (IAWR).

A selected condition signal (s) may be sent to box 107 where the condition may be combined with an event signal.

5. Selection of a particular type of event, or combination of event types (that are to be monitored for a measurement) are set in event selection logic box 107. Various conditions can be imposed in the command to any measurement selection. Examples of collectable CPU signals selectable in box 107 are as follows:

Instruction first cycle (IFC);
Machine cycle;
Address compare;
Microflag event;
Cache hit;
Cache miss;
Caused XI hit/castout; and
DLAT miss.

Other examples in box 107 are combinations of a collected event combined with a selected condition from box 102, and are as follows:

Cache miss on instruction fetch (IFET);
IFC and (IAWR or ICCLATCH);
Microflag event and (IAWR or ICCLATCH);
Cache miss and (IAWR or ICCLATCH);
Caused XI hit/castout and (IAWR or ICCLATCH);
DLAT miss and (IAWR or ICCLATCH); and
IFET cache miss and (IAWR or ICCLATCH).

6. Select an "overrun threshold number" which is compared to the number of times the ITA overruns during a measurement run, (e.g. related to the number of samples lost due to the ITA being filled before it can be read out). If the threshold value is exceeded, the measurement run is automatically terminated. This function may be done by the PCE. (The overrun threshold number may be retained in the PCE program controlling the transfers on path 51 between each ITA and its output buffer.)

The user also may make measurement command selections not solely related to event sampling, such as how to start and stop the instrumentation run, which are retained in a program in the PCE.

In more detail, the measurement control command signals are sent on bus 151 in FIG. 1 from the PCE to each ITU. FIG. 2 shows the command bus 151 received by the PCE command decoder 34 which generates and outputs control signals on a bus 101, which sets up the controls in the ITU, as previously described. The selection settings may be summarized as follows:

A. The instrumentation mode is set in box 100 to event sampling mode, branch event sampling mode, or time sampling mode. (In event sampling mode, or branch sampling mode, time-sampling input pulses received on line 55 are inhibited from reaching any CPU ITU.)

B. The event selection box 107 is to select an event, or combination of event(s) or condition(s).

C. The condition selection box 102 may be set to select the condition(s) that will be active during the measurement run.

D. The Nth event control box 109 is set to the value N. This sets a counter in box 109 to the value N to output a gating signal to gates 31 on each Nth occurrence of the selected event, or the selected combination occurring with any selected condition, so that only each Nth occurrence of the selected event/condition will be recorded in ITA 32.

E. The event signal collector box 104 is set for selecting which of the event signals will be latched for enabling their data collection in the ITA. (This primes a path for selected data to pass from the CPU into the ITU array (31 A–Z) upon occurrence of a sampling trigger from box 109.)

F. The overrun threshold is set in the PCE for termination of the measurement if successive overruns occur.

At some subsequent time the actual measurement begins at a time set by an operator command. This means that selected machine state signals on lines 31 A to Z will now be gated for recording in the ITA at an ITA address selected by ITA address generator 33 on the occurrence of each output signal from box 109.

When any signal occurs on lines 31 A to Z that is to be selected for a sampling operation, the signal is sent to the ITU's event-signal collector 104 from the CPU source where it occurs. The collector 104 latches each selected event signal and forwards it to other areas of the ITU:

1. To event selection logic box 107 to determine whether this signal is to be used for sampling.

2. To the ITA storage gates 31 on bus 111 where the selected signal is gated to the ITA where they are recorded in the current ITA entry as the data being collected.

The event signal bus 103 passes the condition signals, and bus 105 passes some of the event signals to condition selection box 102, where conditionally specifications were set under command control. In box 102, the signals are tested, and if selected they are latched for the measurement run. The latch is outputted on line 106 to box 107 if the selected condition was signalled by the CPU.

In event selection box 107, selected signals are checked for a match against the events previously specified from command path 101 during instrumentation initialization. Only when a selected signal match is found in box 107, is any output pulse forwarded on path 108 to the Nth event control box 109.

In Nth event controls 109, the counter (CTR) is incremented by each occurrence of the event(s)/conditions(s) selected for measurement. Each time the incremented counter reaches value N, a sampling signal is outputted on path 110 to gates 31 to enable the recording in the ITA of the selected set of signals in the latched set provided on bus 111 from collector 104, and then the counter is reset to zero.

Also, the signal on path 110 is provided to the ITA address geneator 33 where it causes a table address counter (TAC) to be incremented. (TAC is a six-bit counter for an ITA data array having 64 entries. The ITU array must have sufficient holding capacity to avoid overruns under normal measurement circumstances.)

This address incrementing logic may be the same for time, branch and event sampling modes. However, as mentioned above, event sampling mode (unlike time sampling mode) is inherently asynchronous between CPU's, so that output control for the ITA is different for event and branch mode sampling than for time mode sampling.

As noted, event sampling may be made conditional on the current instruction address falling within a given range, IAWR (e.g. the PER registers in the S/370 implementation); or on a special latch (ICCLATCH) in box 102 (but not shown) having been set by special state instructions (e.g. diagnose or SIE) placed in the code being measured in order to signal entry to and exit from routines of interest. Condition control allows another dimension of selectivity, in that sampling can be restricted by address range or dynamically turned on and off under program control for certain CPU states or CPU model dependencies.

The branch mode uses branch-taken events which differ from other events and conditions, in that the purpose of recording branches-taken is not primarily to study the hardware characteristics of code execution (such as for cache behavior), but to document the primary paths of program control flow. In such case, the sequence of branch-taken events, rather than their aggregate frequency, is the objective; and this places some special constraints on implementation, which herein treats branch sampling as a separate instruction mode. Conceptually, however, sampling on a branch event is clearly an instance of event sampling.

The recording of event sampling occurs on the setting of N. For frequent events, recording only on the Nth event occurrence is necessary to avoid filling the ITA faster than its recorded content can be moved into its output buffer to prevent buffer overrun.

When CPU state data is sampled at fixed intervals (i.e. time sampling) and recorded for later analysis (to study the interaction between programs and computer structure, and other performance relationships), a problem may exist that some events happen at rates that are difficult to sample, either because they are so frequent that the demanded recording data rates are higher than feasible to record the number of samples taken, or because they happen so seldom and over a very short duration that a large number of samples must be taken over a very long period of time to get a statistically meaningful number of samples that include the event of interest.

Hence, event driven sampling captures the state of the machine at certain specified events, where the events are the occurrence of a specific state, or the fact that a branch instruction has been executed effecting a change in the instruction stream. In other words, in event sampling mode, sampling is not done at arbitrary timer intervals, but only whenever an event (specific state or true branch) has occurred. Multiple sub-elements of the processor may participate in an event sampling run.

Thus, selected conditions within the processor may be used to condition the sampling of selected event(s), such as the condition of the current instruction being within the range of the S/370 PER (program-event recording) registers (IAWR), or the condition that a unique latch has been set through a state-controlling instruction (e.g. SIE or diagnose in S/370XA).

The output buffer control for event sampling is as follows:

When the ITA is full (i.e. indicated by incrementing the TAC to its highest count), inputting from gates 31 into ITA 32 is inhibited, and a signal is provided on line 33B to cause the outputting of the ITA to the associated out buffer in the PCE storage. Then TAC is reset to the first ITA address on its address bus, and the ITA is again filled, etc.

A second table address counter (not shown) may be provided in box 33 to provide the input address to the ITA, so that inputting via gates 31 may continue into half of the ITA while its other half is outputted under control of addresses generated by TAC. Thus by outputting half of the ITA at a time, the other half is concurrently available to receive event samples. The outputting of the first and second halves of ITA is controlled by a first-half full signal on line 33A and a second-half full signal on line 33B. (Alternatively, when only a single TAC is used for both input and output of the ITA, inputting to the ITA is locked out, i.e. inhibited, during its outputting to avoid potential interference.)

When the Nth signal on bus 110 reaches the ITA control gates 31, that enables the storing of an event sample in the ITA 32 at the current address indicated by TAC.

The measurement operations for an ITU during event sampling are eventually terminated according to the commands which specified the measurement.

The data flow in the CPU involves its various subelements that forward instrumentation data through lines 31A to 31Z as the machine signal interface to the ITU. These data signal inputs are the same for event sampling mode as they are for time sampling mode, except that for event sampling the event-related signals are forward via paths 103, 105 and 111A for the processing of selected event(s)/condition(s) into recording samples. Storing in an ITA entry can occur only at the instant when a signal is provided on bus 110, so that each sample inputted into the ITA 32 corresponds to a single occurrence of the selected event(s)/condition(s) upon each Nth occurrence.

If address generator uses only one TAC counter for both ITA input addressing and output addressing, the CPU signals received by the ITA gates 31 are stored in the ITA only if: (1) A trigger signal on bus 110 is provided from Nth event control 109, and (2) the ITA input is not locked while the TAC in the address generator 33 outputs the filled ITA content to its out buffer.

A requirement for the implementation of event sampling is that the data for recording a sample inputted to ITA 32 must convey the machine state existing at the time the pertinent machine signals were generated in the CPU. In other words, the machine state data recorded in the ITA must be reasonably contemporary with the signals representing the occurrence of the event. This requirement might fail to be met if substantial delay were to occur in the signal processing in boxes 104, 102, 107, 109 and 31, or through some kind of lookahead that tries to anticipate a future machine state.

In CPUs comprised of very high speed logic circuits, it may not be possible in a single machine cycle to operate control logic 102, 104, 107, 109 and gates 31, and still be able to record the selected data in ITA 32 in the same cycle, or even in the next cycle. In such case, a greater delay may become necessary for sampling the machine states in the ITA, for example three cycles after the occurrence of a selected event signal. In such case, the data path to the ITA may not be precisely timed with the CPU generation of the event signals.

If such substantial delay exists, the recorded sample data will to some extent not fully represent the true event environment. The degree of representation loss will depend on the amount of delay.

The PCE activity during system measurement controls the operation of the associated out buffer. The PCE monitors each out buffer and causes it to be written to disk when full. The PCE also logs a count of overruns of each ITA. Overruns indicate data loss; and depending on their frequency, overruns may affect the measurement accuracy of a run. If the user has specified an overrun threshold as a particular number of overruns, a measurement run may be terminated if the overrun threshold is reached.

Although this invention has been shown and described with respect to a single embodiment thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. Internal processor instrumentation means for monitoring the software/hardware operations of a data processing system, which includes one or more processors, a system control console having displaying screens under control of a system operator; each processor having machine cycling circuits, and I/O controls; each processor having a plurality of internal lines for transferring internal signals including signals indicating processor condition states; an event-driven monitoring means comprising:

signal collection means for registering internal signals occurring during one or more machine cycles, the signal collection means being connected to and located in proximity to internal signal lines in a processor, condition selection logic means having inputs connected to internal lines for receiving selected internal signals indicating condition states in the processor and determining the condition states to be used in the determination of monitoring events in event-driven monitoring operations for the processor, event selection logic means having inputs connected to the signal collection means and to the condition selection logic means, the event selection logic means determining the occurrence of a monitoring event from selected inputs from the condition selection logic means and the event selection logic means, and the event selection logic means having an output for signalling the occurrence of a monitoring event to be used in a monitoring operation, an internal instrumentation table unit (ITU) having an instrumentation table array (ITA) that includes a plurality of ITA entries and includes addressing means for selecting a current entry in the ITA, gating means being associated with the signal collection means for selecting and transmitting registered internal signals from the collection means to the ITU, the gating means being enabled by the occurrence of the monitoring event determined by the event selection logic means, the gating means transmitting selected signals from the collector means to the current entry in the ITA when a monitoring event is determined to have occurred by the event selection logic means, and the ITU temporarily storing the internal signals transmitted by the gating means to the ITA, and recording means being connected to the ITU for receiving the event monitored data temporarily stored in the ITA entries when the ITA is filled during an event-driven monitoring operation for the processor.

2. An event-driven monitoring means as defined in claim 1, the signal collection means further comprising:

signal selection means for indicating the selection of a subset of the internal signals registerable in the signal collection means for limiting the internal signals usable in a monitoring operation, means under control of the signal selection means for gating out the subset of internal signals from the signal collection means to the current entry in the ITA in response to the occurrence of a monitoring event determined by the event selection logic means, and means for resetting the content of the signal collection means after the signals are gated out.

3. An event-driven monitoring means as defined in claim 1, the condition selection logic means further comprising:

condition determination means for logically combining selected internal signals indicating processor condition states to obtain condition combinations usable in limiting a determination of a monitoring event in a monitoring operation in the processor.

4. An event-driven monitoring means as defined in claim 1, further comprising:

settable counting means being connected to the output of the event selection logic means to receive each monitoring event output determined by the event selection logic means for a monitoring operation, the settable counting means being settable to select each Nth occurrence of the monitoring event output, Nth event control means connected to the settable counting means and to the gating means for enabling the gating means to transfer to the ITU the internal signals registered in the collector means on the occurrence of each Nth output as the monitoring event selected by the settable counting means.

5. An event-driven monitoring means as defined in claim 2, the signal collection means further comprising:

a plurality of latch means, a latch means being set on by an internal signal selected for being registered in the latch means, an output of the latch means, when set on, being a registered signal in the signal collection means, and the resetting means setting off the latch means after selected signals in the signal collection means are gated to the current entry in the ITA in response to the occurrence of a monitoring event outputted by the event selection logic means.

6. An event-driven monitoring means as defined in claim 4, the condition selection logic means further comprising:

address range selection means for selecting a range of addresses as a condition state for enabling the outputting of a monitoring event from the event selection logic means, means for sensing when an instruction address in the processor is in the range selected by the address range selection means to provide the condition state to the event selection logic means for use in determining the occurrence of a monitoring event.

7. An event-driven monitoring means as defined in claim 4, the event selection logic means further comprising:

signal combining means for receiving a selected set of internal signals from the signal collection means and the condition selection logic means and selecting one or a combination of the received signals for generating an event monitoring signal indicating the occurrence of a monitoring event in the processor being monitored.

8. An event-driven monitoring means as defined in claim 4, further comprising:

a command controller means connected between the system control console and the monitoring means in a processor, console control means for receiving monitoring control commands entered on console display screens by the operator, command transmitting means in the command controller means for sending monitoring control commands entered by a system operator to the monitoring means internal to a processor, the monitoring means registering the commands to control a monitoring operation in the processor.

9. An event-driven monitoring means as defined in claim 8, further comprising:

registering means in the signal collection means for storing a part of a monitoring control command received from the command transmitting means for indicating the selection of a subset of internal signals receivable by the signal collection means from the internal lines connected to the signal collection means.

10. An event-driven monitoring means as defined in claim 8, further comprising:

registering means in the condition selection logic means for storing a part of a monitoring control command received from the command transmitting means for indicating the selection of a subset of internal signals receivable by the condition selection logic means from internal lines connected to the condition selection logic means.

11. An event-driven monitoring means as defined in claim 8, further comprising:

registering means in the event selection logic means for storing a part a monitoring control command received from the command transmitting means indicating the selection of a particular logical combination of internal signals received from the signal collection means and the condition selection logic means for use in determining the monitoring event signals to be outputted from the event selection logic means.

12. An event-driven monitoring means as defined in claim 8, further comprising:

registering means in the settable counting means for storing a part a monitoring control command received from the command transmitting means for storing the selection of an N count for controlling the Nth event control means to enable each Nth output from the event selection logic means to be used as the monitoring event for a monitoring operation.

13. An event-driven monitoring means as defined in claim 1, further comprising:
   an output buffer means for receiving the content of the ITU in a processor being monitored in the system;
   means for initiating the transfer of the content of the ITU to the output buffer when all ITA entries in the ITU in the processor are full;
   means for inhibiting the event-driven monitoring means from transmitting signals to the ITA from when the ITA is full until the content of the ITA has been transferred to the output buffer means.

14. A monitoring means internal to a data processing system, comprising:
   an event-driven monitoring means as defined in claim 1, the event-driven monitoring means operating aperiodically for a processor being monitored in the system,
   time-sampling monitoring means being provided internal to each processor in the system, the time-sampling monitoring means operating periodically for monitoring a predetermined group of internal signals in each processor being monitored in the system, time-sampling means being synchronized among all processors that are time-sampling monitorable in the system,
   a command controller means connected between the system control console having display screens under operator control and the monitoring means in a processor,
   command transmitting means in the command controller means for sending monitoring control commands entered by a system operator on the display screen and transmitting each monitoring control command to the monitoring means internal to the processors, the monitoring means registering the commands to control a monitoring operation in each processor to be monitored, and
   a monitoring-mode control means in the system for being set by the command transmitting means to either an event-driven monitoring mode or a time-sampling monitoring mode for enabling, respectively, either an event-driven monitoring operation or a time-sampling monitoring operation in the system.

* * * * *